United States Patent [19]

Szuminski et al.

[11] Patent Number: 4,529,130

[45] Date of Patent: Jul. 16, 1985

[54] TURBO MACHINE NOZZLE WITH THRUST REVERSER

[75] Inventors: Gary F. Szuminski; Robert F. Tape, both of Marietta, Ga.

[73] Assignee: Rolls-Royce Inc., New York, N.Y.

[21] Appl. No.: 372,017

[22] Filed: Apr. 26, 1982

[51] Int. Cl.³ .............................................. F02K 1/60
[52] U.S. Cl. ............................................ 239/265.29
[58] Field of Search ..................... 239/265.17, 265.19, 239/265.23–265.33, 265.37–265.41; 244/12.5, 23 D; 60/226.1, 226.2, 229, 271

[56] References Cited

U.S. PATENT DOCUMENTS

| 3,690,561 | 9/1972 | Potter ............................ 239/265.29 |
| 3,759,467 | 9/1973 | Roudil ............................... 60/229 X |
| 3,837,411 | 9/1974 | Nash et al. ................. 239/265.29 X |
| 4,375,276 | 3/1983 | Konarski ........................ 239/265.29 |

*Primary Examiner*—Andres Kashnikow
*Attorney, Agent, or Firm*—Cushman, Darby & Cushman

[57] ABSTRACT

An exhaust nozzle for a gas turbine engine comprising a duct 17(c) and a mechanism for varying the geometry and area of the nozzle. The mechanism includes a plurality of movable flaps 38 which in at least one position define a convergent part of the nozzle. Upstream of the flaps 38 there is provided one or more outwardly directed openings 59 in the wall of the duct 17(c) and a pair of mutually confronting doors 61 which rotate about an axis transverse to the length of the duct. The doors 61 are located relative to the duct 17(c), the openings 59 and the flaps 38, so that in a first position, the doors 61 obturate the one or more openings 59 and provide a substantially unrestricted flow path through the nozzle. The doors are movable to a thrust reverse position where they uncover the said openings 59 and cooperate with the flaps 38, when the flaps 38 are in a convergent position, so that the flaps 38, together with the doors 61 provide deflecting surfaces that redirect the flow of gases out through the said openings.

9 Claims, 4 Drawing Figures

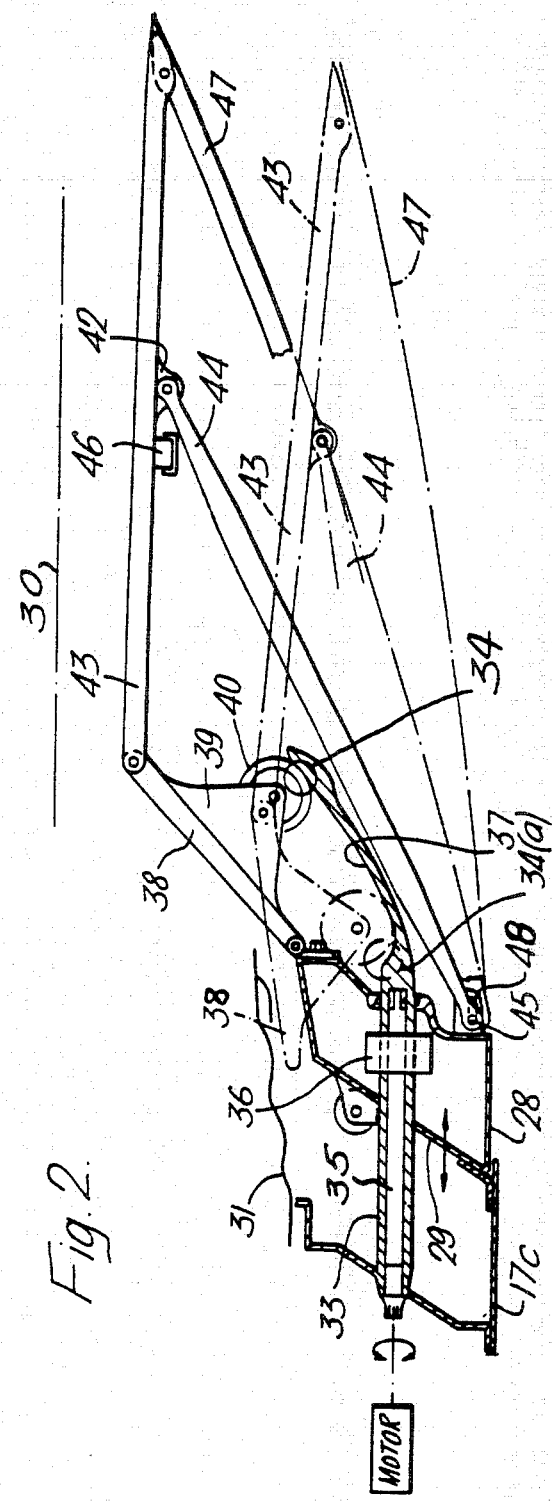
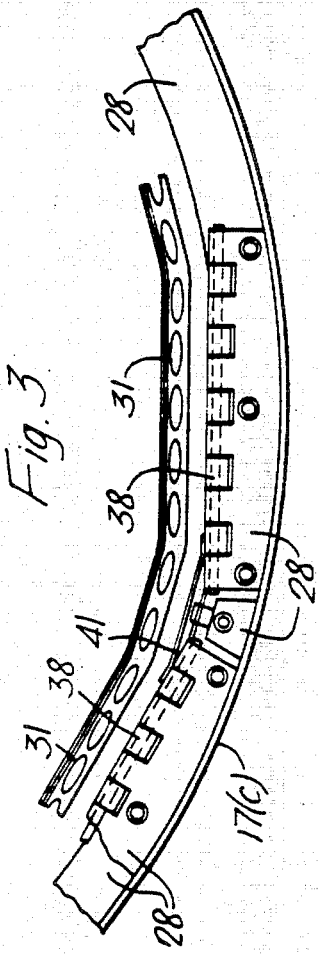
Fig. 2.
Fig. 3

TURBO MACHINE NOZZLE WITH THRUST REVERSER

The U.S. Government has rights in this invention pursuant to Contract No. F33615-81-C-2002 awarded by the United States Air Force.

This invention relates to variable area nozzles for turbomachines and is particularly, although not exclusively, concerned with nozzles that can be swivelled to vary the direction of thrust produced by the turbomachines, and produce reverse thrust.

Afterburning, or reheat, is a method of augmenting the basic thrust of a gas turbine engine and comprises the introduction and burning of additional fuel between the engine turbine and the jet pipe nozzle utilizing the unburnt oxygen in the exhaust gases to support the combustion.

Also, with engines such as the Rolls-Royce Limited's Pegasus engine in which cold by-pass air is discharged from vectorable "cold" nozzles, it is known to burn additional fuel in the air stream supplied to the nozzles to increase thrust. This is commonly referred to as plenum chamber burning (P.C.B.).

In both reheat and P.C.B. modes of operation, it is necessary to be able to increase the outlet area of the respective nozzle, to give an area suitable for the resultant increase in the volume of the gas stream to prevent any increase in pressure occurring that would otherwise affect the efficient functioning of the engine. The actual area of the nozzle is dictated by many factors which affect the mass flow of air through the engine, such as for example, altitude, ambient temperature, forward speed of the aircraft, and speed of the engine.

With nozzles that are swivellable, the mechanism for varying the area of the outlet must be simple to operate, capable of being operated independently of the mechanism for swivelling the nozzle, robust, and lightweight so as not to impose unacceptable loads on the mechanism for supporting and swivelling the nozzle.

The invention as claimed provides a variable area nozzle for a turbomachine, which is simple to operate, robust and lightweight. The nozzle is also suited for use as a swivellable nozzle and is capable of producing reversed thrust.

The invention will now be described, by way of an example, with reference to the accompanying drawings in which:

FIG. 2 illustrates in more detail a sectional elevation of part of the rear nozzle of the engine shown in FIG. 1, FIG. 3 shows in greater detail part of the set of first flaps of the nozzle of FIG. 2, and, FIG. 4 illustrates a thrust reverser constructed in accordance with the present invention.

Figure 1:
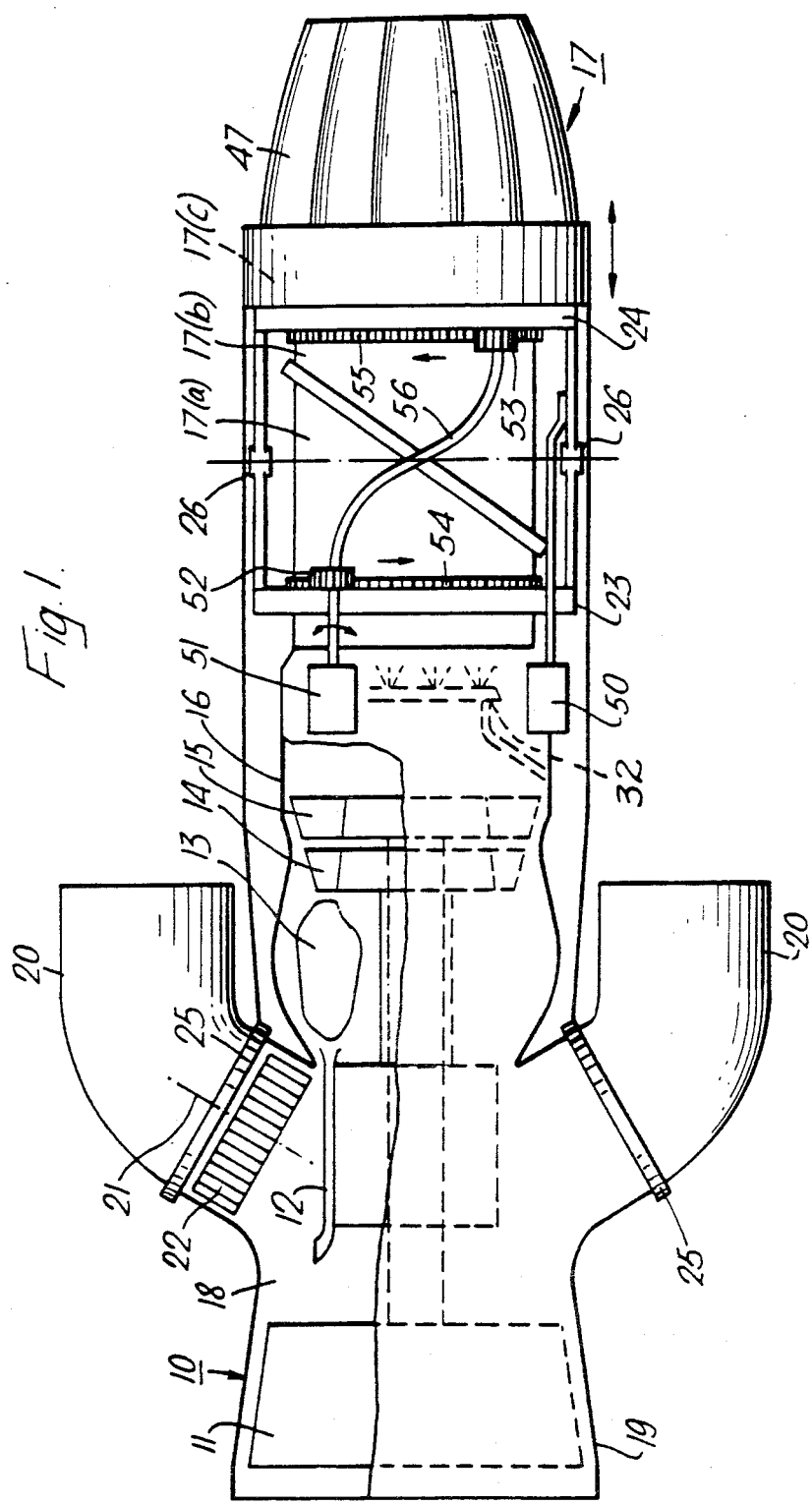
FIG. 1 illustrates schematically a gas turbine aero-engine incorporating three vectorable nozzles. For convenience only one of the nozzles is shown constructed in accordance with the present invention.

Referring to FIG. 1 there is shown schematically a gas turbine aero engine 10 of the by-pass type. The engine comprises in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable variable area nozzle 17.

The L.P. compressor 11 supplies compressed air to the H.P. compressor 12 and to a plenum chamber 18 which forms part of the by-pass duct 19 and which terminates in two vectorable nozzles 20. The nozzles 20 are mounted in bearings 25 for rotation through an angle of approximately 110° about an axis 21.

Additional combustion equipment 22 is provided in the plenum chamber 18 so that additional fuel can be burnt in the air stream ejected through the nozzles 20 to increase the thrust. To enable the engine to run efficiently the nozzles 17 and 20 are provided with variable-area, variable-geometry outlets and are constructed in accordance with the present invention.

For convenience the invention will be more particularly described with reference to nozzle 17 but it is to be understood that the mechanism for varying the area and geometry is similar for all the nozzles 17 and 20, and may also be used with nozzles for fixed jet pipes.

The nozzle 17 is of the type in which a scarfed rotatable duct 17(a) is mounted in bearings 23 on the downstream end of the jet pipe 16, and a second scarfed duct 17(b) is mounted in bearings 24 for rotation in the opposite direction to that of duct 17(a). The bearing 24 is, in turn, rotatable bodily on trunnions 26 which extend transverse to the axis of duct 17(b). This type of nozzle is described in more detail in co-pending U.S. patent application No. 376,388 entitled Vectorable Nozzles for Turbomachines naming Gary Frank Szuminski and Thomas John Jones as the inventors. In operation the bearing 24 is rotated about the axis of the trunnions 26 by means of a screw jack (shown schematically by the numeral 50) which pushes on the brackets that support the bearing 24 in the trunnions 26. As the bearing 24 is swung about the axis of the trunnions 26 the ducts 17(a) and 17(b) are rotated in opposite directions by means of a motor 51 and sprockets 52,53, chain drives 54,55 and flexible drive shaft 56 as explained in the above-mentioned U.S. patent application.

The nozzle 17 has at its downstream end a duct 17(c) which is carried by the fixed race of the bearing. It is this duct 17(c) that is provided with the mechanism for varying the geometry and area of the outlet of the nozzle 17 in accordance with the present invention, as shown in FIGS. 2 and 3.

Referring to FIGS. 2 and 3, the mechanism for varying the geometry and area of the outlet nozzle comprises an annular member 28 which is translatable axially and on which is carried three sets of flaps as will be described below. The member 28 is mounted to slide axially inside the downstream end duct 17(c) and the member 28 comprises an annular hollow box structure which has a face 29 extending in a direction transverse to the axis 30 of the duct 17(c). Pressurised gas flowing through duct 17(c) acts on face 29 to urge the member 28 rearwards.

The member 28 slides inside the bore of the duct 17(c) and a heat shield liner 31 is provided to protect the duct 17(c) and the member 28 from the hot gases flowing through the nozzle when the reheat combustor 32 in the jet pipe is ignited.

The member 28 is supported on axially extending tubes 33 which carry an annular cam-ring assembly 34.

Located in at least some of the tubes 33 is a lead screw 35 of a screwjack which engages a nut 36 (of the recirculating ball type) fixed to the member 28. Rotation of the lead screws 35 by a motor drive through gearboxes pushes and pulls the member 28 to and fro in the axial direction.

The cam ring assembly 34 comprises two polygonal frameworks of tubes 34(a) interconnected by which a plurality of cams 37 facing inwards (only one of which is shown) The cams 37 are equispaced around the axis 30.

A set of first primary flaps 38 is pivotally attached to the member 28. Each first primary flap 38 is povitally attached at its upstream end to the downstream inner circumferential end of the member 28 and has a web 39 projecting from its outer facing side. The web 39 carries a cam follower 40, in the form of a roller, that engages one of the cams 37 to define and vary the attitude of the flap 38 relative to member 28 as member 28 is moved in axial directions.

The flaps 38 comprise a hollow structure with spaced walls which are made from a carbon-carbon material such as Pyrocarb (Registered U.S. Trade Mark) material as manufactured by Hitco of USA). Pyrocarb materials comprise a carbon matrix in which is embedded a woven cloth of carbon fibres. The material is projected from oxidation either by overcoating it with a non-oxidising protective layer or by impregnating silicon into it and converting the silicon to silicon carbide.

A second primary flap 43 is pivotally attached at its upstream end to the downstream end of each first primary flap 38. Each flap 43 is a hollow structure of spaced carbon-carbon walls similar to flaps 38, and each flap 43 is provided with a lug 42 partway along its length.

The flaps 38 are spaced apart circumferentially and each of the gaps between the flaps 38 is closed off by thin seal plate 41 (see FIG. 3 which is a section through the hinge between flaps 38 and the member 28). The seal plates 41 are located on the inward-facing side of the flaps 38 and are constrained from falling inwards by means of rollers 46 that engage the outside surface of the flaps 43. The seal plates 41 accommodate different positions of the flaps 38 by sliding circumferentially.

A plurality of struts 44 are pivotally attached at one of their ends to a downstream outer circumference of the member 28. Each of the struts 44 is pivotally connected at its outer end to the lug 42 of one of the second flaps 38.

Here again, the second flaps 43 are spaced circumferentially and the gaps between them are closed-off by thin carbon-carbon seal plates 45 that are pivotally attached at their upstream end to the downstream end of the seal plates 41. The seal plates 45 are located on the inward-facing side of the flaps 43 and are constrained from falling inwards by rollers 46 which are mounted on flanges that project through the gaps between flaps 43 to engage the outer surface of the flaps 43. The seal plates 45 allow the flaps 43 to assume different positions where they define a convergent part of the nozzle to where they define a divergent part of the nozzle by sliding relative to the flaps 43. The seal plates 45 do not have lugs 42 and no struts 44 are connected to the seal plates 45.

A set of third flaps 47 made of a carbon fibre reinforced polyimide material are provided on the member 28. Each of the third flaps 47 is pivotally attached at their upstream end to the downstream end of the member 28, and are pivotally attached at their downstream ends to the downstream end of one of the second flaps 38. The pivot 45 at the upstream end of the third flaps 47 locates in an elongated hole 48 in the member 28.

The flaps 47 overlap each other to accommodate the different positions of the flaps 47.

In operation of the nozzle with the member 28 in the fully rearwards position shown in solid lines in FIG. 2, the flaps 38 define a convergent part of the nozzle and the flaps 43 define a parallel or slightly divergent part of the nozzle with the throat area of the nozzle (in a radial plane of the pivotal connections between the flaps 38 and 43) at a minimum dimension. This configuration would be used for a subsonic dry maximum thrust mode of operation such as for take-off, or subsonic accelerations.

By pulling the member 28 forwards the cam followers 40 move along the cams 37 and the flaps 38 define a parallel or slightly convergent part of the nozzle (as shown with dotted lines) a maximum area throat, and flaps 43 define a divergent part of the nozzle with a maximum area exit at the downstream ends of flaps 43. This configuration would be used for maximum thrust with reheat or P.C.B. mode of operation.

As flaps 38 and 43 take up different positions the seal plates 41 and 45 slide to fill up the gaps between the respective flaps 38 and 43. Also, the flaps 47 are moved to alter the boat-tail angle and thereby reduce base drag.

The gas loads on the flaps 38 and 43 and seal plates 41 and 45 are transmitted back to the member 28 and exert a net force forwards (i.e. towards the jet pipe 16) on the member 28. Accordingly, by exposing the front face of the member 28 to the pressurised gases flowing through the duct 17(c) the gases exert a rearward force on the member 28 that partly counterbalances the forward loads exerted on the member 28. This in turn reduces the forces required to move the member 28 in axial directions. The area of the front face 29 of the member can be chosen to achieve the optimum rearwards force on the member 28.

Clearly, at intermediate positions between those shown in solid and dotted lines in FIG. 2 various combinations of convergence and divergence with different throat areas can be obtained.

Figure 4:
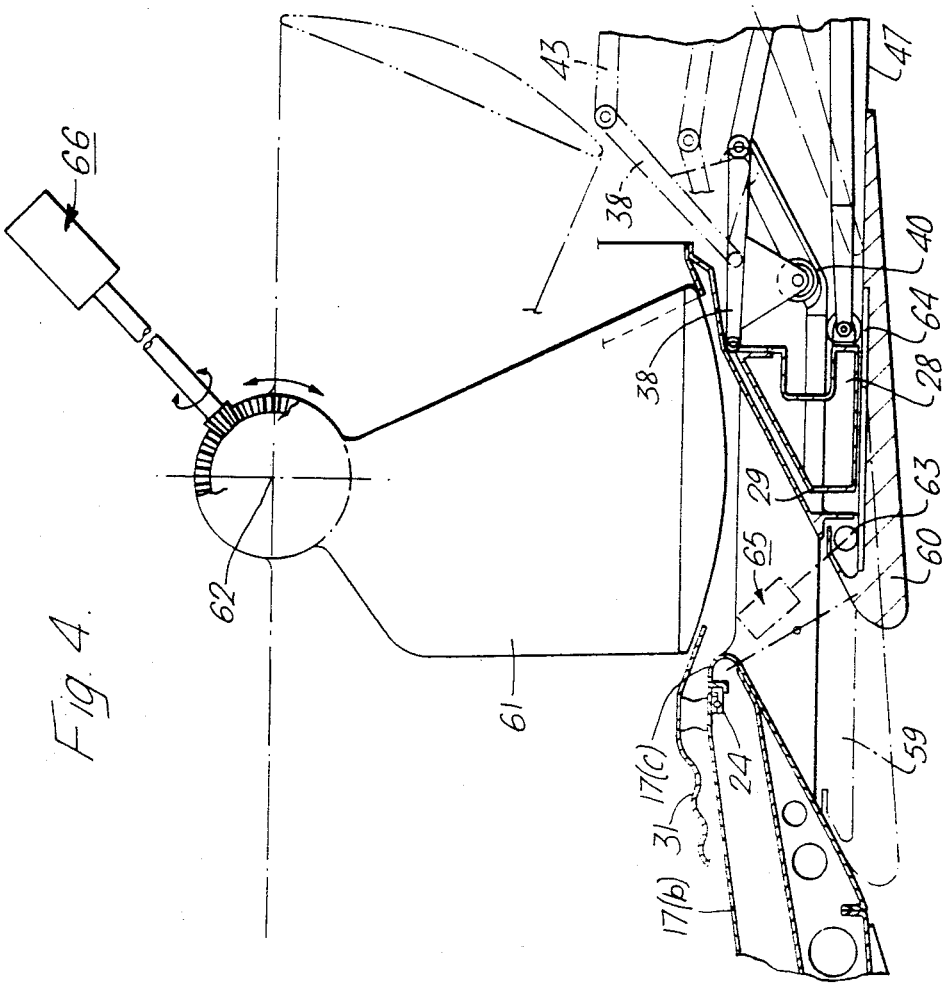

Referring to FIG. 4 the duct 17(c) is provided with forwardly directed outlet openings 59 spaced around its circumference. An axially translatable hollow cylindrical cover door 60 is provided to obturate the outer extremity of all the outlet openings 59. A pair of frusto-hemispherical hollow clamshell doors 61 which pivot about a transverse axis 62 of the duct 17(c), is provided to close off the inner extremities of the outlet openings when the doors 61 are in a stowed position.

The cover door 60 is supported concentrically relative to the bearing 24 by means of eight circumferentially spaced pinion gears 63 which engage racks 64 on the inside circumference of the cover door 60. The gears 63 are driven by means of a motor 65 which drives all the gears 63 via gearboxes and drive shafts (not shown) so that they rotate in unison to move the door 60 axially to open and close the openings 59. A motor 66 is provided to rotate the clamshell doors 61 about axis 62 from the stowed position (shown in solid lines) to a reverse thrust position (shown dotted) where the exhaust gases are deflected out of the openings 59.

An important feature of the present invention is that the clamshell doors 61 are provided at the throat of the nozzle. That is to say that the doors 61 co-operate with the flaps 38 when they are deployed to form a convergent duct as would be the case when the engine is operated in the "dry" subsonic mode. The drive to the gears 63 is synchronised with the drive to the clamshell doors 61 so that the door 60 is moved to open the openings 59 only when the clamshell doors 61 are moved to the reversed thrust position. In addition the drive to the mechanism that moves the member 28 axially to vary the geometry of the nozzle is synchronised so that the clamshell doors 61 can be moved to the reverse thrust position only when the flaps 38 are in the convergent position (that is when the member 28 is pushed rearwards to its fullest extent and the engine is operating in the "dry" subsonic mode).

By locating the clamshell doors 61 at the region of the throat of the nozzle and by using the flaps 38 to assist in forming part of the deflecting surface during thrust reverse mode, the clamshell doors 61 can be made with smaller and, therefore, are lighter and much easier to deploy. This is particularly important when a thrust reverser is required on a nozzle that can be vectored.

However, it cannot be stressed too strongly, that although the nozzle described above has been described in connection with a vectorable nozzle, the present invention is eminently suitable for use at the downstream end of a fixed Jet pipe.

We claim:

1. An exhaust nozzle for a gas turbine engine comprising a duct and a mechanism for varying the geometry and area of the nozzle, which mechanism includes a plurality of movable flaps which in at least one position define a convergent part of the nozzle, at least two outwardly directed openings in the wall of the duct provided upstream of said flaps and a pair of mutually confronting doors which rotate bodily in an arcuate path about an axis transverse to and extending through the axis of the duct, the doors being located relative to the duct, the openings and the flaps, so that, in a first position the doors obturate said at least two openings and provide a substantially unrestricted flow path through the nozzle, and in a second position they uncover the said openings and abut each other and cooperate with the flaps when the flaps are in a convergent position to obturate said duct so that the flaps together with the doors provide deflecting surfaces that redirect the flow of gases out through the said openings.

2. An exhaust nozzle according to claim 1 wherein a second door means is provided to obturate an outer extremity of said openings.

3. An exhaust nozzle according to claim 1 wherein the mechanism for varying the geometry and area of the nozzle comprises a member that is translatable relative to the duct in a direction extending along the length of the duct and the flaps are pivotally mounted at their upstream end to the member.

4. A nozzle according to claim 3 wherein the translatable member is mounted to slide on axially extending supports and the supports carry an annular framework that defines a plurality of axially extending cam surfaces spaced around the axis of the annular framework.

5. A nozzle according to claim 4 wherein the cam surfaces face inwards and each flap is provided, on its outer facing side, with the cam follower that co-operate with one of the cam surfaces.

6. An exhaust nozzle according to claim 3 wherein the flaps comprise an axisymmetric array of first flaps and the mechanism for varying the geometry and area of the nozzle further includes an axisymmetric array of second flaps each of which is pivotally mounted at its upstream end to the downstream end of one of the first flaps, and constraining means are provided for constraining the second flaps to assume a divergent position relative to the duct in at least one position of the second flaps.

7. An exhaust nozzle according to claim 6 wherein the constraining means comprises a plurality of struts each of which is pivotally attached at one end to the member and is pivotally attached at its other end to one of the second flaps.

8. An exhaust nozzle according to claim 6 wherein an axisymmetric array of third flaps are provided, each of the third flaps being pivotally connected at their downstream end to the downstream end of a second flap and being mounted at its upstream end on the said axially translating member.

9. A nozzle according to claim 8 wherein the axially translatable member is a right circular cylindrical annular structure and the first flaps are pivotally mounted on an inner circumference of the annular member, and the third flaps are pivotally mounted on an outer circumference of the member.

* * * * *